Figure 1:
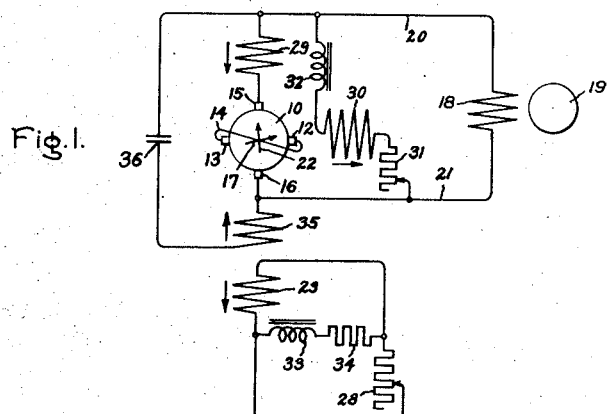

Jan. 7, 1941.  E. F. W. ALEXANDERSON ET AL  2,227,992

DYNAMOELECTRIC MACHINE

Filed June 24, 1939

Inventors:
Ernst F. W. Alexanderson,
Martin A. Edwards,
by Harry E. Dunham
Their Attorney.

Patented Jan. 7, 1941

2,227,992

UNITED STATES PATENT OFFICE 2,227,992

DYNAMOELECTRIC MACHINE

Ernst F. W. Alexanderson and Martin A. Edwards, Schenectady, N. Y., assignors to General Electric Company, a corporation of New York Application June 24, 1939, Serial No. 281,008

19 Claims. (Cl. 171—223)

This invention relates to direct-current commutator type dynamoelectric machines, and to electrical systems utilizing machines of this type, wherein the armature reaction of the machine provides a source of excitation thereto.

A direct-current machine of the armature reaction excitation type is a dynamoelectric machine which may be operated as a motor, a generator, or a rotary transformer, and is provided with a rotor or armature having a winding and a commutator of the conventional direct-current dynamoelectric machine type. The stationary member of such a machine usually is arranged to provide a path of low magnetic reluctance to the magnetic flux set up by the armature currents, and may be provided with various windings to improve or control the operation of the machine. The basic principle of operation of our machine is similar to that of the Rosenberg generator in that it depends upon armature reaction flux produced by current flowing between two sets of brushes for providing the desired characteristics of the machine. The Rosenberg type direct-current generator is characterized by its constant output current characteristic. We have found that by providing special stator field exciting windings, this type dynamoelectric machine may be made to provide a controllable variable voltage and variable current characteristic with a very high rate of response and high amplification ratio. These features are of particular importance when this type machine is used to control other electrical apparatus, as in regulator and exciter systems. In order to obtain this high amplification ratio and low time constant, the stator is provided with a main control winding having a very low number of turns in order to reduce its inductance, and another field exciting winding is arranged to neutralize or compensate for the normal armature reaction produced by the load or secondary current of the machine.

Under certain operating conditions, such a machine may be very unstable and a third component of excitation is provided which is responsive to a secondary characteristic of the machine to neutralize the mutual coupling between the main control winding and the compensating winding. This arrangement damps out any tendency for the machine to set up oscillations and thereby increases the applicability thereof to various types of loads.

When this type machine is connected to certain types of loads, undesirable electrical oscillations may be set up in the system. This is particularly the case when the load which is connected across the secondary brushes of the machine is predominately an inductive load, as where the machine is used as an exciter to energize a field exciting winding. This tendency to set up electrical oscillations between the load and the machine may be substantially eliminated by the proper design of the relationship between the compensating winding and the armature and control field exciting windings. The armature winding arrangement will tend to damp out direct current and low frequency oscillations and will tend to increase oscillations of higher frequencies at which the system tends to oscillate. On the other hand, the compensating field exciting winding arrangement will tend to increase oscillations of low frequency or of a direct-current nature, but will tend to damp out higher frequency oscillations. In order to avoid oscillations, the damping effects of the compensating winding and the armature winding should be equal or greater than the tendency to increase these oscillations. As stated it has been found that the effects of these two windings for direct current and alternating current are opposite. An analysis of the reasons for this result indicates that there are two accumulative phase displacements that determine the relation of the output or secondary alternating current to the current in the control field exciting winding. At low frequencies, the sum of this phase displacement is less than 90° with respect to the current in the control field exciting winding, but at higher frequencies, the sum of this phase displacement is more than 90°, so that where the frequency of the alternating current is such that the phase displacement becomes more than 90°, the tendency for the system to increase the oscillations is greater than the tendency for the machine to dampen these oscillations. Furthermore, compensation for direct current depends upon the magnetomotive force in the armature winding, whereas with alternating current oscillations, there is an additional mutual coupling between the compensating field exciting winding and the control field exciting winding which is similar to that of the windings of a transformer, as these two field exciting windings are wound concentrically on the stationary member of the dynamoelectric machine. For certain machines, it is possible to proportion the compensating field exciting winding, the armature winding, and the control winding substantially to avoid these oscillations. In most cases, however, and particularly when the load is highly inductive, it has been found desirable to add a separate back coupling circuit to neutralize the internal back coupling effect of alternating current oscillations.

An object of our invention is to provide a dynamoelectric machine having high amplification and quick response characteristics.

Another object of our invention is to provide an electrical system including an inductive or reactive load supplied by an armature reaction dynamoelectric machine and an arrangement for avoiding oscillations therebetween.

Further objects and advantages of our invention will become apparent and our invention will be better understood from the following description referring to the accompanying drawing, and the features of novelty which characterize our invention will be pointed out with particularity in the claims annexed to and forming part of this specification.

Figure 2:
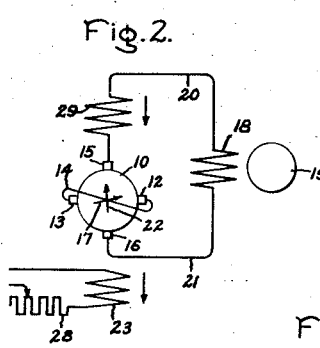
Figure 3:
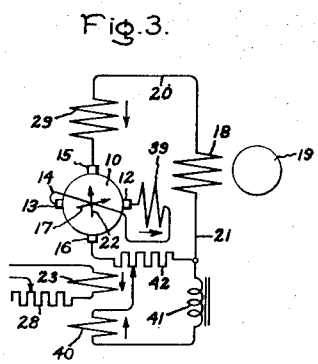
Figure 4:
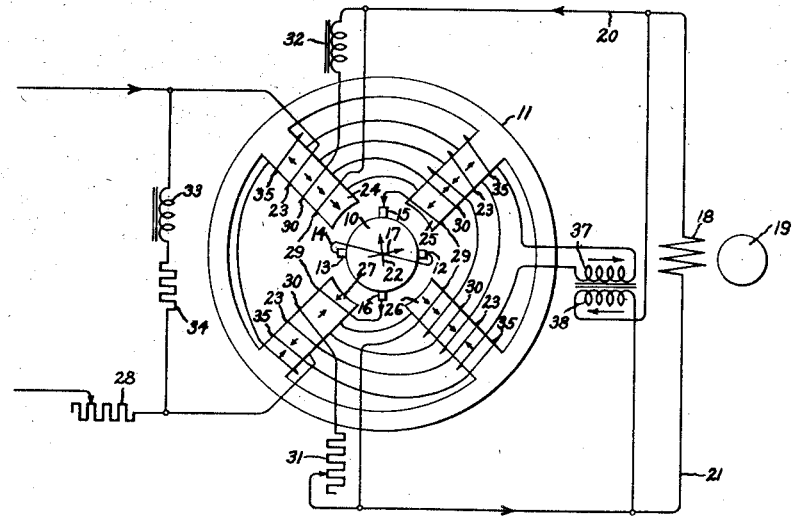

In the accompanying drawing, Fig. 1 is a diagrammatic illustration of an electrical system including an inductive load supplied by a dynamoelectric machine embodying our improved control field exciting winding arrangement; Fig. 2 illustrates diagrammatically a simplified form of the arrangement shown in Fig. 1; Fig. 3 illustrates another system including a modification of our improved dynamoelectric machine excitation arrangement; and Fig. 4 illustrates a further modification of a system including an arrangement of field exciting windings on the stationary member of a dynamoelectric machine of the type shown in Fig. 1.

Referring to the drawing, we have shown an armature reaction excited dynamoelectric machine arranged as a generator provided with a rotatable member or armature 10 having a commutator connected to an armature winding of the conventional direct-current type and adapted to be driven at substantially constant speed by any suitable source of mechanical power. For illustrative purposes, the machine has been shown as having a two pole excitation system, and, as shown in Fig. 4, each of the poles includes two pole pieces mounted on the stationary member 11. With this type excitation system, the armature is provided with a set of primary brushes 12 and 13 which are connected together by a short-circuiting conductor 14 to provide a primary circuit through the armature 10. A set of secondary brushes 15 and 16 also contacts the commutator of the armature 10 and is electrically displaced about the commutator from the primary brushes 12 and 13 and provides a secondary circuit through the armature. In order to obtain a substantially balanced distribution of electric currents through the various parts of the armature, the secondary brushes 15 and 16 are displaced substantially 90 electrical degrees from the primary brushes 12 and 13. Since the primary brushes 12 and 13 are short-circuited, a very small amount of flux is required to induce a voltage between these brushes to build up a relatively large primary current through that part of the armature winding which is connected between these brushes. This primary current will produce a magnetic flux or primary armature reaction along the primary axis as indicated by the arrow 17. As the armature 10 rotates, the conductors which are connected to the secondary brushes 15 and 16 will cut the primary armature reaction flux and a voltage will be induced between these brushes. If these brushes are connected to a load, such as a field exciting winding 18 of a motor 19 by conductors 20 and 21, a secondary or load current will flow through the secondary circuit in the armature and produce a secondary armature reaction along the axis of these brushes, as indicated by the arrow 22 in the drawing.

In order to control the secondary or load characteristics of the generator, a field exciting winding 23 is arranged to provide a component of magnetic excitation along the secondary commutating axis of the machine in opposition to the secondary armature reaction 22, as indicated by the arrows in the drawing. As shown in Fig. 4, sections of this field exciting winding are mounted upon pole pieces 24 and 25 so as to provide a component of excitation in these pole pieces acting in the same direction with respect to the armature and upon pole pieces 26 and 27 to provide the same polarity to each of these pole pieces and to provide poles of opposite polarity with respect to the pole pieces 24 and 25. The excitation which is thus provided by the field exciting winding 23 arranged on the pole pieces 24, 25, 26 and 27 induces an electromotive force in the armature winding between the primary brushes 12 and 13. Any suitable means, such as the variable resistor 28 connected in series with the winding 23, may be arranged to vary the energization of this winding so as to control the excitation thereof. As can be seen from Fig. 4, the excitation provided by this field exciting winding on the four pole pieces 24, 25, 26 and 27 is, in effect, the excitation which would be provided to the armature by two pole pieces arranged along the commutating axis of the secondary brushes 15 and 16. By providing separate pole pieces, as shown in this drawing, or by providing a distributed winding with a slot formed along the axis of the secondary brushes, the commutation of the machine is improved, as the flux cut by the conductors directly connected to the brushes is thereby reduced.

The excitation provided by the control winding 23 opposes the secondary armature reaction 22, and the sensitivity of its control can be increased by reducing the secondary armature reaction flux. In order to accomplish this, we provide a field exciting winding 29 which is arranged to provide a component of magnetic excitation along the secondary commutating axis of the machine in opposition to the secondary armature reaction 22, as indicated by arrows in the drawing. The excitation provided by this field exciting winding is arranged substantially to neutralize the magnetic back coupling of electric current in the secondary circuit of the armature with the primary armature circuit by substantially neutralizing the armature reaction flux along the secondary axis. This field exciting winding 29 is adapted to neutralize substantially the armature reaction 22 under all load conditions, and is mounted upon the pole pieces 24, 25, 26 and 27 to provide a component of excitation thereto substantially along the secondary commutating axis of the armature in the same direction as the control field exciting winding 23. The compensation provided by this field exciting winding 29 is made proportional to the secondary or load current in the armature by connecting it directly in series with the secondary brush 15, and since the brushes 15 and 16 are arranged between the pole pieces, the compensating flux does not materially affect the commutation of the machine, and the distribution of this flux provided by this winding arrangement is more effective than if it were provided by a single pole piece mounted directly along the secondary commutating axis. The effectiveness of this compensating winding 29 also may be further improved by using a fully distributed winding arrangement, so that the magnetomotive force provided thereby will be more evenly distributed around the periphery of the armature. With this secondary armature reaction compensating system, the controlling field exciting winding 23 is only required to supply a relatively small excitation and may be made relatively much smaller, thereby reducing its resistance and inductance and increasing its speed of response and sensitivity of control.

Thus the armature reaction excited generator can be made to have a high amplification factor; that is, a relatively small amount of power is required for the control field exciting winding and the machine inherently has a high rate of response. It is to be noted, however, that the excitation in the primary axis which produces the secondary or load voltage is furnished by the primary armature circuit. In general, the primary excitation current in this circuit will be of the same order of magnitude as the load current, so that the current which flows through the armature is substantially twice that of the conventional direct-current machine of the same capacity. This additional current increases the heating of the machine, and the armature, therefore, would have to be somewhat larger than in a conventional direct-current machine of the same rating to provide for this additional heating.

The primary source of excitation may be changed from the armature winding to a winding on the stationary member of the machine by adding a field exciting winding connected directly across the secondary brushes to provide a component of magnetic excitation having a polarity such that the flux set up by the winding is in the same direction as the primary armature reaction flux 17. In order to obtain this result, we provide a field exciting winding 30, as shown in Figs. 1 and 4, energized in accordance with the secondary or load voltage of the machine and arranged on the pole pieces 24, 25, 26 and 27 to provide an effective component of excitation along the primary commutating axis, as indicated by the arrows in the drawing, in the same direction as the primary armature reaction flux 17, by providing excitation of one polarity to the pole pieces 24 and 27, and excitation of the opposite polarity to the pole pieces 25 and 26. In this manner, the excitation of the field exciting winding 30 forms two effective poles, each of which includes two pole pieces. This excitation, however, introduces an undesirable magnetic back coupling with the armature secondary circuit which may produce abnormally high currents in this circuit under transient conditions due to the amplification of secondary voltage variations by this field exciting winding. To avoid such undesirable magnetic back coupling, the field exciting winding 30 is connected across the secondary terminals of the armature through a variable resistor 31 and an inductive reactance 32, arranged externally to the magnetic circuit of the machine, so that the field exciting winding 30 may be made to provide the required excitation with relatively few turns having a relatively low inductance and resistance. The external inductive reactance 32 and resistance 31 connected in series with the field exciting winding 30 effectively increase the reactance and resistance of this field exciting winding circuit, so as to damp out the effect of transients upon the energization of the winding, and provide a stabilizing effect upon the machine.

The time constant and speed of response of the machine is further improved, as shown in Figs. 1 and 4, by connecting an inductance 33 and resistance 34 across the terminals of the control field exciting winding 23 in order to provide a field forcing arrangement thereacross. This inductive field forcing circuit is arranged to have a relatively higher reactance than the control field exciting winding 23, so that any increase in voltage will be immediately effective upon the field exciting winding 23 and only a relatively small instantaneous increase in current will flow through the inductive field forcing circuit. As the current increases through the inductance 33, the corresponding increase in voltage drop across the resistance 28 will reduce the current through the field exciting winding 23 to the desired steady-state condition. On the other hand, when the voltage is reduced or removed from the terminals of the field exciting winding 23, the inductance of the reactor 33 will provide a voltage across the field exciting winding 23 opposite in direction to the voltage removed therefrom, so that the current through the field exciting winding 23 not only will decrease due to the removal of the energizing voltage, but will even tend to reverse in direction. In this manner, the response of the control field to variations in the controlling voltage impressed thereacross is greatly increased and the effective time constant of this controlling circuit is correspondingly decreased.

The tendency of this type machine to set up electrical oscillations between the load and the machine may be substantially eliminated by the proper design of the relationship between the compensating winding and the armature and control field exciting windings. In most cases, however, and particularly when the load is highly inductive, it has been found desirable to add a separate back coupling circuit to neutralize the internal back coupling effect of alternating current oscillations. Such arrangements are illustrated in Figs. 1 and 4.

This neutralizing back coupling circuit includes a field exciting winding 35 which is arranged on the pole pieces of the stationary member so as to provide a magnetomotive force on each of these pole pieces acting in a direction opposite to that of the compensating field exciting winding 29. This field exciting winding 35 is energized in accordance with a secondary characteristic of the machine, so that alternating current oscillations will have opposite effects in the compensating field exciting winding 29 and the back coupling neutralizing field exciting winding 35. This winding may be connected in various ways to obtain this result, and as shown in Fig. 1, it may be connected through a reactive member such as a condenser 36 across the secondary circuit of the machine. Another manner for connecting this field exciting winding 35 is illustrated in Fig. 4, wherein the winding is connected across the secondary 37 of a transformer having its primary winding 38 connected across the secondary terminals of the machine.

In Fig. 3 we have provided a field exciting winding 39 connected in series with the primary brushes 12 and 13 and arranged to provide a component of excitation along the primary commutating axis in the same direction as the primary armature reaction 17. Thus, to obtain a given secondary voltage the primary armature current will be reduced by the amount which would be required to provide the excitation of the field exciting winding 39. Another field exciting winding 40 is arranged to provide a component of excitation in opposition to the control field exciting winding 23 and is connected through an inductance 41 across a variable resistance 42. In this manner the excitation of this winding 40 is dependent upon the load on the machine 10, but due to the inductance 41, does not respond immediately to changes in the load current and lags slightly behind such changes. Thus, the control field exciting winding 23 tends to produce a greater transient change in net excitation when its energization first is varied than the steady-state net excitation along its axis. Such a field exciting winding arrangement also tends to neutralize the mutual coupling of the field exciting windings 29 and 23. This provides another field forcing arrangement for the control field exciting winding, and also may be used with machines having excitation systems like those of Figs. 1, 2, and 4. While the arrangements shown in Figs. 1 and 3 illustrate machines which are compensated for oscillations of a direct current and alternating current nature, and also are provided with a stationary member field exciting winding 30 which is adapted to minimize armature current heating, it is possible to obtain satisfactory operation with certain types of loads using a machine as shown in Fig. 2.

While we have illustrated and described particular embodiments of our invention, modifications thereof will occur to those skilled in the art. We desire it to be understood, therefore, that our invention is not to be limited to the particular arrangements disclosed and we intend in the appended claims to cover all modifications which do not depart from the spirit and scope of our invention.

What we claim as new and desire to secure by Letters Patent of the United States is:

1. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means for controlling the secondary characteristics of said machine, and means for substantially neutralizing mutual coupling of electric current in said secondary circuit of said rotatable member with said control means.

2. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means including a field exciting winding for controlling the secondary characteristics of said machine, and means for substantially neutralizing mutual coupling of electric current in said secondary circuit of said rotatable member with said controlling field exciting winding.

3. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means including a field exciting winding for controlling the secondary characteristics of said machine, a second field exciting winding arranged to provide a component of excitation responsive to the voltage across said secondary brush set and in substantially the same direction as the armature reaction excitation of electric current in said primary circuit, and means external to said stationary member field exciting windings of said machine for minimizing mutual coupling of electric current in said primary circuit with said second field exciting winding.

4. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, a field exciting winding arranged to provide a component of excitation responsive to electric current in said secondary circuit along substantially the same axis and in opposition to armature reaction excitation of electric current in said secondary circuit, means for controlling the secondary characteristics of said machine, and means for substantially neutralizing mutual coupling of electric current in said first mentioned field exciting winding with said control means.

5. A dynamoelectric machine having a stationare member and a rotatable member provided with a commutator, a set of primary brushes and a set of secondary brushes electrically displaced from said primary brush set adapted to provide a primary and a secondary circuit respectively through said rotatable member, means including a field exciting winding for controlling the secondary characteristics of said machine, and means for substantially neutralizing mutual coupling of electric current in said secondary circuit of said rotatable member with said controlling field exciting winding, and a second field exciting winding arranged to provide a component of excitation responsive to the voltage across said secondary brush set and in substantially the same direction as the armature reaction excitation of electric current in said primary circuit.

6. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, a field exciting winding arranged to provide a component of excitation responsive to electric current in said secondary circuit along substantially the same axis and in opposition to armature reaction excitation of electric current in said secondary circuit, means including a second field exciting winding for controlling the secondary characteristics of said machine, and means for substantially neutralizing mutual coupling of electric current in said first mentioned field exciting winding with said control field exciting winding.

7. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, a field exciting winding arranged to provide a component of excitation responsive to electric current in said secondary circuit along substantially the same axis and in opposition to armature reaction excitation of electric current in said secondary circuit, means for controlling the secondary characteristics of said machine, and means including a second field exciting winding for substantially neutralizing mutual coupling of electric current in said first mentioned field exciting winding with said control means.

8. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means for substantially neutralizing mutual coupling of electric current in said secondary circuit of said rotatable member with said primary circuit of said rotatable member, a field exciting winding arranged to provide a component of excitation responsive to the voltage across said secondary brush set and in substantially the same direction as armature reaction excitation of electric current in said primary circuit, and means arranged to provide a component of excitation of said rotatable member for controlling the secondary characteristics of said machine.

9. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, a field exciting winding arranged to provide a component of excitation responsive to the load on said machine along substantially the same axis and in opposition to armature reaction excitation of electric current in said secondary circuit, and means including a second field exciting winding arranged to provide a component of excitation responsive to the voltage across said secondary brush set and in substantially the same direction as armature reaction excitation of electric current in said primary circuit for supplying substantially all the excitation along said axis under normal steady state operating conditions.

10. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, a field exciting winding arranged to provide a component of excitation responsive to electric current in said secondary circuit along substantially the same axis and in opposition to armature reaction excitation of electric current in said secondary circuit, a second field exciting winding arranged to provide a component of excitation responsive to the voltage across said secondary brush set and in substantially the same direction as armature reaction excitation of electric current in said primary circuit, and means arranged to provide a component of excitation to said rotatable member for controlling the secondary characteristics of said machine.

11. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means including a field exciting winding for substantially neutralizing mutual coupling of electric current in said secondary circuit with said primary circuit, a second field exciting winding arranged to provide a component of excitation responsive to the voltage across said secondary brush set and in substantially the same direction as armature reaction excitation of electric current in said primary circuit, means including a third field exciting winding for controlling the secondary characteristics of said machine, and inductive means having relatively higher reactance than said third field exciting winding connected thereacross for increasing the rate of response thereof.

12. A dynamoelectric machine having a stationary member and a rotatable member provided with a commutator, a set of primary brushes and a set of secondary brushes for said commutator adapted to provide a primary and a secondary circuit respectively through said rotatable member, means including a field exciting winding for substantially neutralizing mutual coupling of electric current in said secondary circuit with said primary circuit, a second field exciting winding arranged to provide a component of excitation responsive to the voltage across said secondary brush set in substantially the same direction as armature reaction excitation of electric current in said primary circuit, means for changing the time constant of said second field exciting winding circuit, and means including a third field exciting winding arranged to provide a component of excitation along substantially the same axis as said first mentioned field exciting winding for controlling the secondary characteristics of said machine.

13. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, a field exciting winding arranged to provide a component of excitation responsive to the load on said machine along substantially the same axis and in opposition to armature reaction excitation of electric current in said secondary circuit, means arranged to provide a component of excitation to said rotatable member for controlling the secondary characteristics of said machine, and means including a second field exciting winding arranged to provide a component of excitation responsive to the voltage across said secondary brush set and in substantially the opposite direction to said first mentioned field exciting winding for substantially neutralizing mutual coupling of electric current in said first mentioned field exciting winding with said control means.

14. A dynamoelectric machine having a stationary member and a rotatable member provided with a commutator, a set of primary brushes and a set of secondary brushes for said commutator adapted to provide a primary and a secondary circuit respectively through said rotatable member, a field exciting winding arranged to provide a component of excitation responsive to the load on said machine and in opposition and substantially equal at normal load to armature reaction excitation of electric current in said secondary circuit, a second field exciting winding arranged to provide a component of excitation responsive to the voltage across said secondary brush set in substantially the same direction as armature reaction excitation of electric current in said primary circuit, means including a third field exciting winding arranged to provide a component of excitation in substantially the same direction as said first mentioned field exciting winding for controlling the secondary characteristics of said machine, and inductive field forcing means connected to said third field exciting winding for increasing the rate of response thereof.

15. A dynamoelectric machine having a stationary member and a rotatable member provided with a commutator, a set of primary brushes and a set of secondary brushes for said commutator adapted to provide a primary and a secondary circuit respectively through said rotatable member, a field exciting winding arranged to provide a component of excitation responsive to electric current in said secondary circuit and in opposition and substantially equal at normal load to armature reaction excitation of electric current in said secondary circuit, a second field exciting winding arranged to provide a component of excitation responsive to the voltage across said secondary brush set in substantially the same direction as armature reaction excitation of electric current in said primary circuit, means for changing the time constant of said second field exciting winding circuit, means including a third field exciting winding arranged to provide a component of excitation along substantially the same axis as said first mentioned field exciting winding for controlling the secondary characteristics of said machine, and field forcing means connected to said third field exciting winding for increasing the rate of response thereof.

16. A dynamoelectric machine having a stationary member and a rotatable member provided with a commutator, a set of primary brushes and a set of secondary brushes electrically displaced from said primary brush set adapted to provide a primary and a secondary circuit respectively through said rotatable member, a field exciting winding arranged to provide a component of excitation responsive to the load on said machine along substantially the same axis and in opposition to armature reaction excitation of electric current in said secondary circuit, a second field exciting winding arranged to provide a component of excitation responsive to the voltage across said secondary brush set in substantially the same direction as armature reaction excitation of electric current in said primary circuit, means including a third field exciting winding arranged to provide a component of excitation along substantially the same axis as said first mentioned field exciting winding for controlling the secondary characteristics of said machine, and inductive means having relatively higher reactance than said third field exciting winding connected thereacross for increasing the rate of response thereof.

17. An electrical system including a load, a dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means for connecting said secondary brush set to said load, means including a field exciting winding for controlling the secondary characteristics of said machine, and means including a second field exciting winding and a reactive member external to the magnetic circuit of said machine connected in circuit with said second field exciting winding for substantially neutralizing mutual coupling of electric current in said secondary circuit with said control means to substantially dampen electrical oscillations between said load and said machine.

18. An electrical system including a load, a dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means for connecting said secondary brush set to said load, means for controlling the secondary characteristics of said machine, and means including a field exciting winding and a reactive member for substantially neutralizing mutual coupling of electric current in said secondary circuit with said control means to substantially dampen electrical oscillations between said load and said control means.

19. An electrical system including a load, a dynamoelectric machine having a stationary member and a rotatable member provided with a commutator, a set of primary brushes and a set of secondary brushes electrically displaced from said primary brush set adapted to provide a primary and a secondary circuit respectively through said rotatable member, means for connecting said secondary brush set to said load, a field exciting winding arranged to provide a component of excitation responsive to electric current in said secondary circuit along substantially the same axis and in opposition to armature reaction of electric current in said secondary circuit, means for controlling the secondary characteristics of said machine, and means including a second field exciting winding and a reactive member in circuit with said second field exciting winding for substantially neutralizing mutual coupling of electric current in said first mentioned field exciting winding with said control means to substantially dampen electrical oscillations between said load and said machine.

ERNST F. W. ALEXANDERSON.
MARTIN A. EDWARDS.

DISCLAIMER 2,227,992.—*Ernst F. W. Alexanderson* and *Martin A. Edwards*, Schenectady, N. Y. DYNAMOELECTRIC MACHINE. Patent dated Jan. 7, 1941. Disclaimer filed June 22, 1945, by the assignee, *General Electric Company*.

Hereby enters this disclaimer to claims 9 and 10 of said patent.

[*Official Gazette July 24, 1945.*]